(12) United States Patent
Schuh

(10) Patent No.: US 10,100,856 B2
(45) Date of Patent: Oct. 16, 2018

(54) MOUNTING ELEMENT FOR FASTENING A TENSIONING FRAME PART OF A TENSIONING FRAME AND METHOD FOR FASTENING A TENSIONING FRAME PART OF A TENSIONING FRAME BY MEANS OF THE MOUNTING

(71) Applicant: Rainer Schuh, Wr. Neustadt (AT)

(72) Inventor: Rainer Schuh, Wr. Neustadt (AT)

( * ) Notice: Subject to any disclaimer, the term of this patent is extended or adjusted under 35 U.S.C. 154(b) by 1035 days.

(21) Appl. No.: 14/371,806

(22) PCT Filed: Jan. 11, 2013

(86) PCT No.: PCT/EP2013/050489
§ 371 (c)(1),
(2) Date: Jul. 11, 2014

(87) PCT Pub. No.: WO2013/107697
PCT Pub. Date: Jul. 25, 2013

(65) Prior Publication Data
US 2014/0345780 A1   Nov. 27, 2014

(30) Foreign Application Priority Data
Jan. 16, 2012   (AT) ........................................ 45/2012

(51) Int. Cl.
*G09F 15/00*   (2006.01)
*F16B 2/20*   (2006.01)
*G09F 21/04*   (2006.01)

(52) U.S. Cl.
CPC ............ *F16B 2/20* (2013.01); *G09F 15/0018* (2013.01); *G09F 15/0025* (2013.01); *G09F 21/04* (2013.01); *Y10T 24/34* (2015.01); *Y10T 29/49947* (2015.01)

(58) Field of Classification Search
CPC .. G09F 15/0025; G09F 21/04; G09F 15/0018; B44C 7/022; E06B 9/521; E04B 9/303
See application file for complete search history.

(56) References Cited

U.S. PATENT DOCUMENTS

| | | | | |
|---|---|---|---|---|
| 3,822,734 A | * | 7/1974 | Tombu | B44C 7/022 160/327 |
| 4,279,064 A | * | 7/1981 | Simme | B60J 7/104 160/391 |
| 7,406,996 B2 | * | 8/2008 | Schuh | B60J 7/102 160/328 |
| 7,805,870 B2 | * | 10/2010 | Calderwood | G09F 15/0025 160/328 |
| 8,136,570 B2 | | 3/2012 | Schuh | |
| 2003/0140539 A1 | * | 7/2003 | Green, III | G09F 15/0025 40/603 |

FOREIGN PATENT DOCUMENTS

EP   1604346 A   5/2007
WO   03083812 A   10/2003

* cited by examiner

*Primary Examiner* — Cassandra Davis
(74) *Attorney, Agent, or Firm* — Lucas & Mercanti, LLP; Klaus P. Stoffel

(57) ABSTRACT

Mounting element (3) for fastening a tensioning frame part of a tensioning frame on flat or uneven surfaces. The mounting element (3) has a frame-like fastening section (5), which can be clipped onto the tensioning frame part of the tensioning frame on a first side and has a plurality of support parts (6) variable in length on a second side.

9 Claims, 3 Drawing Sheets

MOUNTING ELEMENT FOR FASTENING A TENSIONING FRAME PART OF A TENSIONING FRAME AND METHOD FOR FASTENING A TENSIONING FRAME PART OF A TENSIONING FRAME BY MEANS OF THE MOUNTING

The present application is a 371 of International application PCT/EP2013/050489, filed Jan. 11, 2013, which claims priority of AT A 45/2012, filed Jan. 16, 2012, the priority of these applications is hereby claimed and these applications are incorporated herein by reference.

BACKGROUND OF THE INVENTION

The invention pertains to a mounting element for fastening a frame part of a tensioning frame to flat or uneven substrates. The invention also pertains to a method for fastening a frame part of a tensioning frame by means of the mounting element.

It is a known conventional practice to use the vertical surfaces of the upper structures of trucks, tractor-trailers, etc., especially the canvas coverings used to cover these upper structures, for advertising purposes. To keep the canvas covers in visually satisfactory condition, especially to prevent wrinkling and distortion, tensioning frame systems are fastened to the upper structures. A tensioning frame system of this type is known from EP 1 604 346 A. The various parts of the tensioning frame are attached by means of screws or rivets. It is also known that the fixed, permanent upper structures of trucks can also be used as advertising surfaces, for which purpose one or more tensioning frames can be mounted on them; such frames also make it possible to replace the canvas advertising covers. These tensioning frames are attached to the upper structures by means of screws, rivets, or adhesives. Uneven substrates, such as profiled substrates made up of trapezoidal pieces of sheet metal or the like make it more difficult to attach the tensioning frames in optimal fashion.

SUMMARY OF THE INVENTION

The invention has the goal of making available a mounting element for the frame parts of tensioning frames to allow these frame parts to be fastened to the fixed upper structures of trucks, trailers, and the like as well as to other types of substrates. This mounting element is intended to even out any irregularities in the surface of the substrate and thus to ensure the secure attachment of the various parts of the tensioning frame to the substrate in question.

This goal is achieved according to the invention by a mounting element with a frame-like fastening section, one side of which can be clipped to a frame part of the tensioning frame, whereas the other side comprises support parts, which are supported on the substrate and the length of which can be varied.

According to the invention, a mounting element of this type is attached by means of an adhesive and/or at least one mechanical fastening element to the substrate and to the frame part.

The inventively designed mounting elements hold the frame part in place simply by clipping onto it, and they then make it possible to fasten the frame part to the substrate either by means of an adhesive and/or by means of mechanical fastening elements. The frame-like design of the fastening section ensures an optimal connection between the frame part and the substrate.

In an especially preferred embodiment of the invention, a plate-like support tongue adjoins the fastening section of the mounting element. A connecting element provided to tighten the canvas cover can be supported two-dimensionally on this support tongue, as a result of which the forces acting in the support direction are effectively absorbed. The support tongue also prevents the frame part from becoming twisted out of shape when it is being installed or removed.

In an especially simple and effective embodiment of the mounting element, which is also associated with low weight, the fastening section and the support tongue lie in the same plane, whereas the support parts are perpendicular to the support tongue and the fastening section.

According to the invention, the fastening section is designed in such a way that it comprises longitudinal and transverse webs arranged to form a rectangle, wherein the support parts are preferably arranged on the transverse webs. This leads to a compact and light-weight design of the mounting element and facilitates the application of a layer of adhesive of defined quantity.

According to another advantageous embodiment of the invention, the support parts are designed in such a way that they can be shortened by a break-off tool. The support parts can therefore be shortened easily by a pair of pliers, for example, in order to compensate for irregularities in the surface of the substrate and to ensure that the frame part is parallel to the substrate.

In the inventively designed mounting element, the clip-on connections can be easily formed by edge parts provided on the transverse webs, these parts being formed with undercut areas.

BRIEF DESCRIPTION OF THE DRAWING

Additional features, advantages, and details of the invention will now be described in greater detail on the basis of the drawing, which illustrates exemplary embodiments.

DETAILED DESCRIPTION OF THE INVENTION

The invention deals with the fastening of a tensioning frame for a canvas cover or the like to any desired type of substrate, especially to the upper structures of trucks or trailers and tractor-trailers with fixed, flat, or uneven walls of plastic, aluminum, or the like. A tensioning frame can cover the entire wall surface, or it can be smaller than the wall surface, being attached to only a portion of the wall. In the normal case, the canvas cover is stretched flat by the lateral and lower parts of the tensioning frame and threaded into or otherwise attached to the upper part of the tensioning frame.

Figure 1:
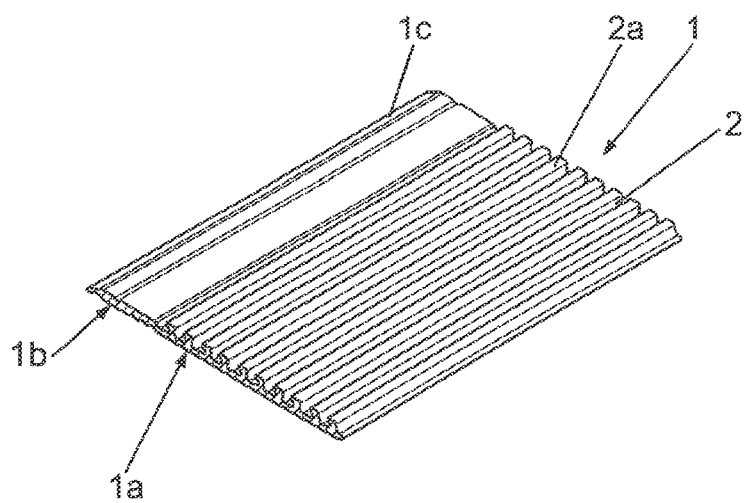
FIG. 1 shows a view of a section of a tensioning frame part.
Figure 2:
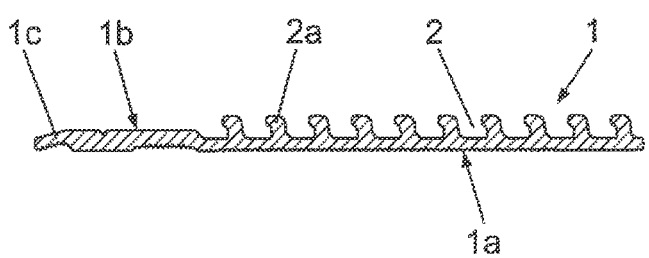
FIG. 2 shows a cross-sectional view of the tensioning frame part of FIG. 1.

FIG. 1 shows a section of a frame part 1 of a tensioning frame. The frame part 1 comprises a section 1a, on the top surface of which a number of grooves 2 are formed, which are parallel to each other and extend in the longitudinal direction of the frame part 1. Adjoining this section 1a is a section 1b, which terminates in a projecting catch part 1c.

The bottom surface of the frame part 1 is flat. The elevations 2a on either side of the grooves 2 form undercuts, in which the hook-like edge 4a of a section 4b of a connecting element 4 engages. A second section 4c, along the edge of which a connecting hook 4d designed to engage with another retaining element for the canvas cover . . . , is on a plane slightly lower than that of section 4b. The additional retaining element(s) serving to connect the canvas cover is/are not an object of the invention and therefore not illustrated.

Figure 3:
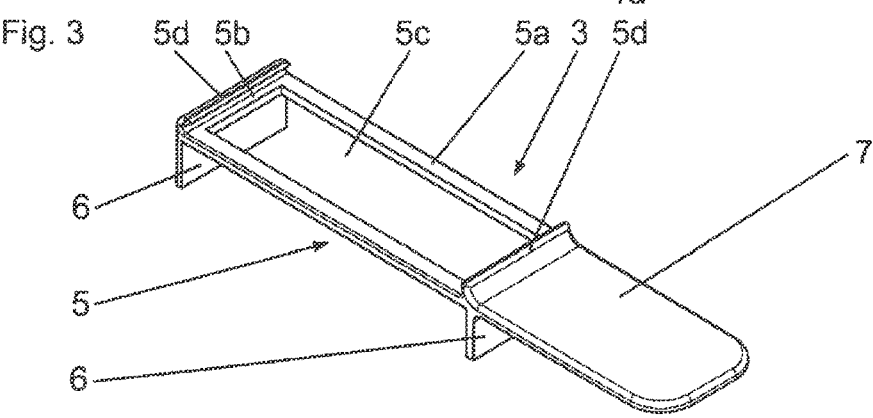
FIG. 3 shows a view of a mounting element.
Figure 4:
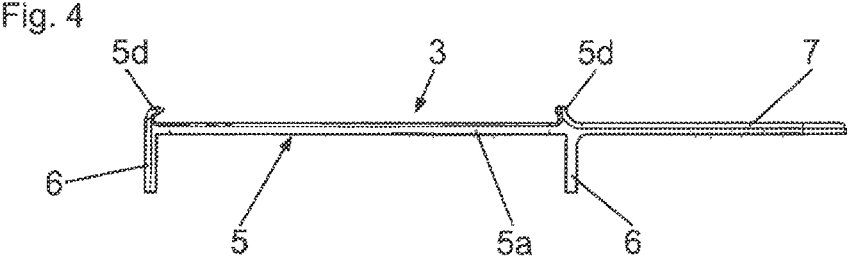
FIG. 4 shows a view of the mounting element of FIG. 3.
Figure 5:
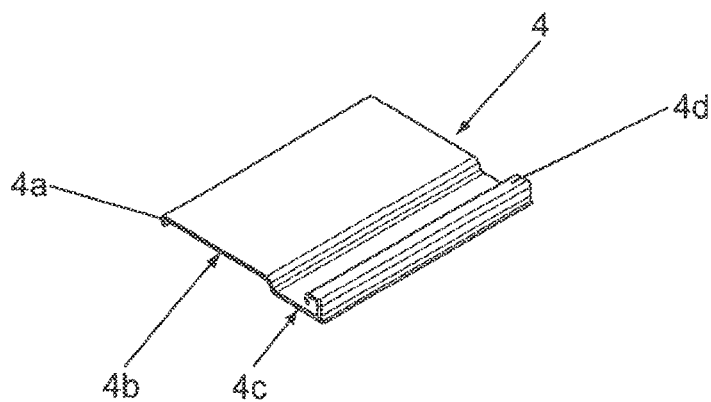
FIG. 5 shows a view of a section of a connecting element.
Figure 6:
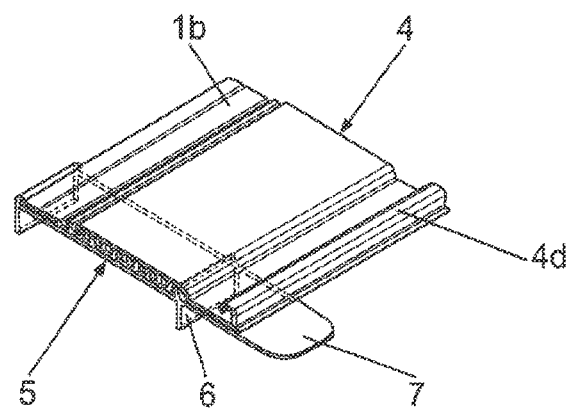
FIG. 6 shows a view of the tensioning frame part equipped with a mounting element and also with a connecting element in the proper position.

FIGS. 3 and 4 show an exemplary embodiment of a mounting element 3 for the frame part 1 with an elongated, rectangular, frame-like fastening section 5 and, lying in the same plane, a support tongue 7; in the embodiment shown here, these two parts have the same width. The fastening section 5 comprises narrow longitudinal and transverse webs 5a, 5b, between which a central opening 5c is formed. Rectangular support parts 6 are attached to the transverse webs 5b, along their length, at a right angle to the fastening section 5a. The support parts 6 extend down from the inside surface, i.e., the mounting surface of the mounting element 3. On the outside surface of the transverse webs 5b, edge parts 5d curving toward the central opening 5c form undercuts, which allow the mounting element 3 to be clipped to the frame part 1. The edge parts 5d allow the clipped-on mounting element 3 to slide relative to the frame part 1 and/or the frame part 1 to slide relative to the clipped-on mounting element 3.

The dimensions of the mounting element 3 and of the tensioning frame part 1 are coordinated with each other. In the case of conventionally designed frame parts 1, the length of the frame-like fastening section 5 is, for example, 7-10 cm; its width is, for example, 2.5-3.5 cm. The width of the webs 5a, 5b is preferably 3-5 mm. The height of the support parts 6 is in particular on the order of 0.7 cm to as much as several centimeters. The thickness of the support parts 6 is approximately 1.5-3 mm. The mounting element 3 is preferably a plastic part produced by injection molding. The mounting element 3 can also be made out of a fiber-reinforced plastic or some other material such as a metal or metal alloy. The support parts 6 allow the mounting element 3 to conform to the substrate; i.e., the support parts 6 can be modified to compensate for irregularities of the substrate, in that they can be shortened by means of an appropriate break-off tool such as a pair of pliers. Alternatively, it is also possible to provide a transverse grooving on at least one of the outside surfaces of the support parts 6 to facilitate the task of shortening the support parts 6.

Several mounting elements 3 are usually used to attach a frame part 1 of the tensioning frame, the exact number depending on the length of the frame part 1. The mounting elements 3 are adapted to conform to the substrate by shortening at least one of the support parts 6, if necessary, so that the top surface of the mounting elements 3 is parallel to the plane of the canvas cover. The mounting elements 3 can first be clipped to the frame part 1, in which case the resulting assembly is then attached to the substrate. Alternatively, it is possible to attach the mounting elements 3 to the substrate first and then to clip them to the frame part 1.

To fasten the mounting elements 3 to the substrate, a layer of adhesive of adequate thickness is applied to the inside surface of the elements. The adhesive is introduced at least between the support parts 6, preferably also underneath the support tongue 7. If the mounting elements 3 are already clipped to the frame part 1, the adhesive connects the frame part 1 to the substrate when the assembly is pressed down onto the substrate; or, if the mounting elements 3 have been bonded to the substrate first, the connection is established by clipping them to the frame part 1.

Figure 8:
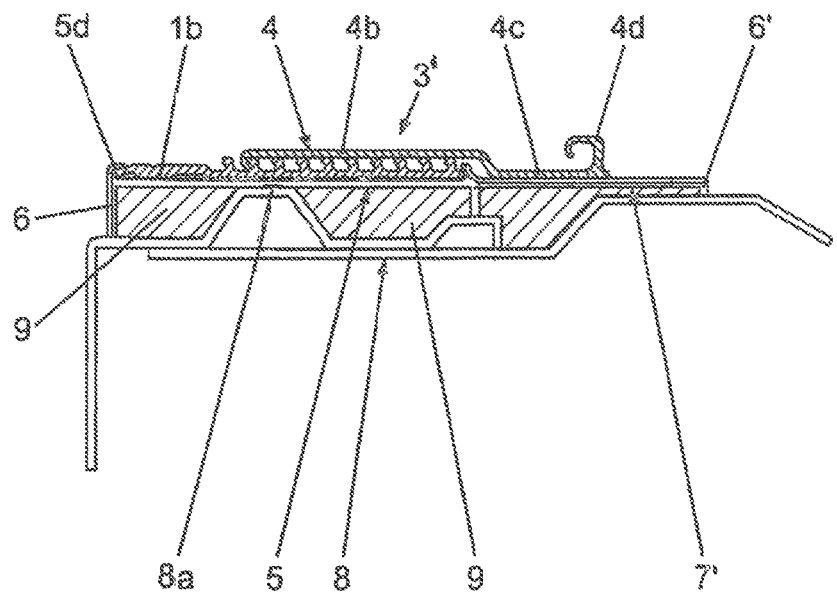
FIG. 8 shows a cross-sectional diagram similar to FIG. 7 with another embodiment of a mounting element with its tensioning frame part and connecting element, attached to an uneven substrate by means of an adhesive.

FIG. 8 shows another embodiment of the invention. The mounting element 3', which is shown with the frame part 1 and the connecting element 4, comprises a fastening section 5, which is similar to that of the first embodiment, and a support tongue 7', which is provided at its free end with another support part 6'. The support part 6' could also be arranged at some other point on the support tongue 7'. The mounting element 3' is attached to a substrate 8, which is made up of trapezoidal pieces of sheet metal or the like and is therefore uneven or profiled, wherein the lengths of the support parts 6 and 6' have been adapted to conform to the substrate 8. In the embodiment shown here, the fastening section 5 lies locally on an elevation 8a of the substrate 8. An adhesive 9, introduced into the intermediate spaces available between the support parts 6, 6', the fastening section 5, the support tongue 7', and the substrate 8, establishes the bond between the frame part 1 and the substrate.

Figure 9:
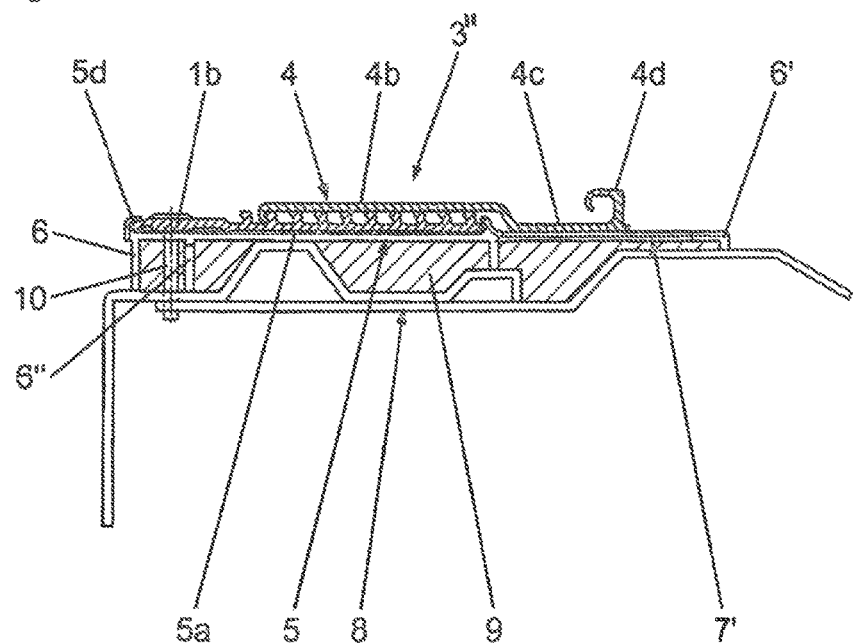
FIG. 9 shows a view, similar to FIG. 8, of another variant of the mounting element with a tensioning frame part and connecting element, attached to an uneven substrate.

The embodiment of a mounting element 3" shown in FIG. 9 differs from that of FIG. 8 in that an inner support part 6" is also arranged on the fastening section 5 a short distance from the outer support part 6. Between these two support parts 6, 6", a permanent connection of the mounting element 3" to the substrate 8 is established by means of a rivet 10 or alternatively by means of a screw, in that the rivet 10 connects the section 1b of the frame part 1 to the substrate 8. An adhesive 9 can also be used, as described in the exemplary embodiment according to FIG. 8.

With respect to the preferred dimensions of the mounting elements 3', 3", reference can be made to the relevant discussion of the mounting element 3. The fastening of the frame part 1 by means of the mounting elements 3', 3" can also be carried out as described above. If an adhesive is not used, the mounting elements 3" are first clipped to the tensioning frame part 1.

Figure 7:
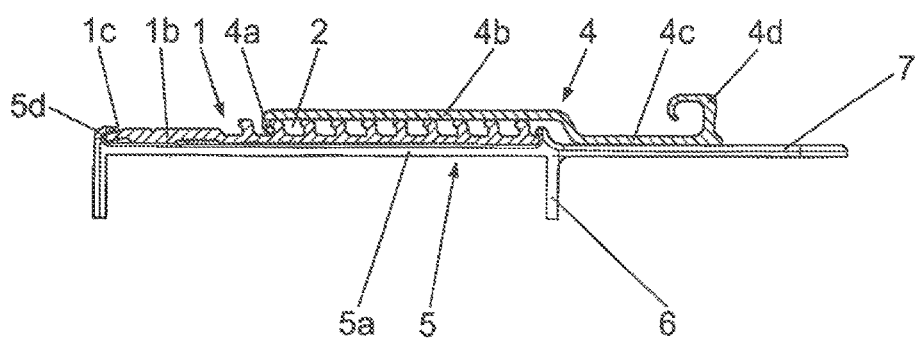
FIG. 7 shows a cross-sectional view of FIG. 6.

To stretch out the canvas cover, the connecting element 4 is snapped under the tension of additional retaining elements (not shown) into a groove 2, as shown in FIGS. 7-9. The section 4b of the connecting element 4 comes into two-dimensional contact with the support tongue 7, 7'. As a result, the forces are evenly distributed, and the durability of the connection is increased.

In a design variant of the mounting element not separately illustrated, the element can be made without a support tongue. The dimensions of the individual components of the mounting element can also be varied. Especially in the case of level substrates, the support parts can also be provided on the longitudinal webs of the frame-like fastening section of the mounting element. Of course, it is possible to use inventive mounting elements with tensioning frame systems of any desired type.

LIST OF REFERENCE NUMBERS 1 frame part
1b section
1c projecting catch part
2 groove 2a elevation
3, 3', 3" mounting element
4 connecting element
4a edge
4b section
4c section
4d connecting hook
5 fastening section
5a longitudinal web
5b transverse web
5c opening
5d edge part
6, 6', 6" support part
7, 7' support tongue
8 substrate
8a elevation
9 adhesive
10 rivet

The invention claimed is:

1. A mounting element for fastening a frame part of a tensioning frame to level or irregular substrates, comprising:
a frame-like fastening section having one side that can be clipped to the frame part of the tensioning frame and an opposite side that comprises several support parts of variable length.

2. The mounting element according to claim 1, wherein a plate-like support tongue adjoins the fastening section.

3. The mounting element according to claim 2, wherein the fastening section and the support tongue lie in a common plane.

4. The mounting element, according to claim 2, wherein the support part are perpendicular to the support tongue and to the fastening section.

5. The mounting element according to claim 2, wherein one of the support parts is arranged on the support tongue.

6. The mounting element according to claim 1, wherein the support arts are configured to be parallel to the frame part after the mounting element has been clipped onto the frame part.

7. The mounting element according to claim 1, wherein the fastening section comprises longitudinal and transverse webs, wherein one of the support parts is arranged in an area of each transverse web.

8. The mounting element according to claim 7, wherein clip-on, connections are formed by undercut-forming edge parts provided on the transverse webs of the fastening section.

9. The mounting element according to claim 1, wherein the support parts are configured to be shortenable by a break-off tool.

* * * * *